March 3, 1942.    T. F. JOHNSON    2,274,899
CONNECTING MEANS
Filed Sept. 16, 1940
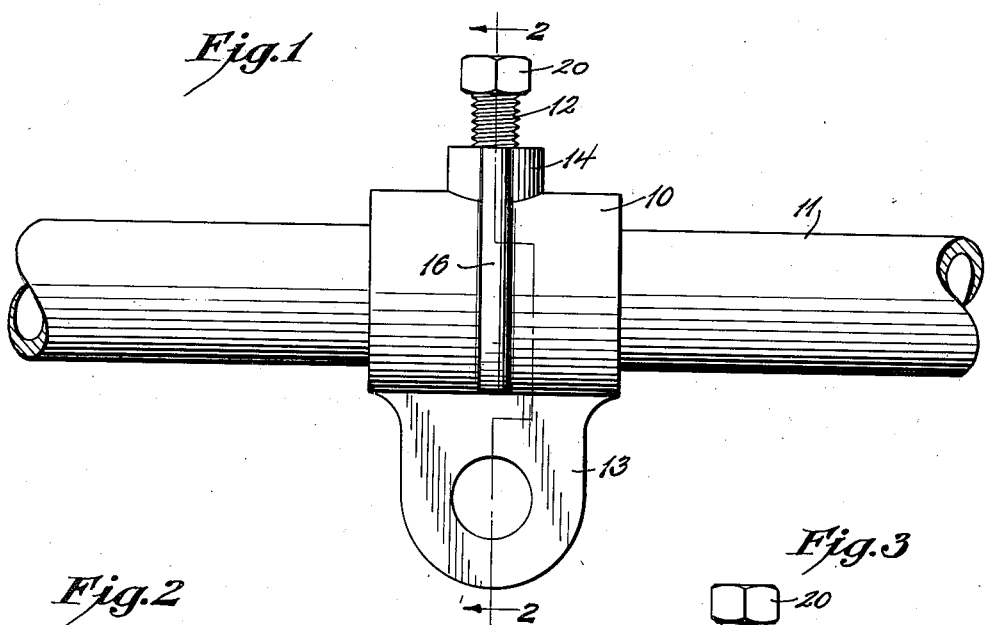
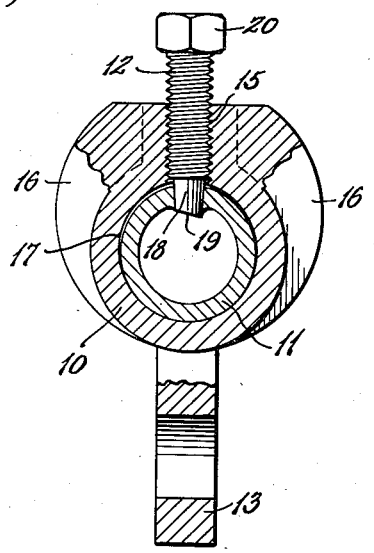
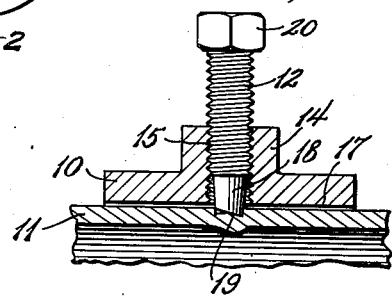
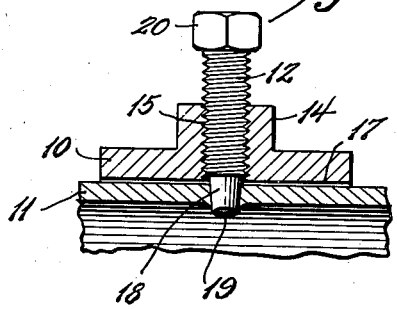
Inventor
T. F. Johnson
By A. D. Adams
Attorney Patented Mar. 3, 1942

2,274,899

UNITED STATES PATENT OFFICE 2,274,899

CONNECTING MEANS

Tomlinson F. Johnson, Atlanta, Ga.

Application September 16, 1940, Serial No. 357,068

3 Claims. (Cl. 85—1)

This invention relates to connecting means for fastening an encircling member such as a collar or the like to a hollow rod or pipe and aims, among other objects, to provide a self-piercing set screw associated with such a collar adapted easily to pierce the pipe.

Another object is to provide integral means on the set screw frictionally to lock it to the pipe and to prevent loosening thereof due to vibration.

Another object is to provide means on the set screw to seal the opening formed by the set screw and prevent rust from forming at that point.

Other aims and advantages of the invention will appear in the specification, when considered in connection with the accompanying drawing, wherein:

Figure 1 is a side elevation of one embodiment of the improved set screw applied to a clamping collar on a piece of pipe;

Figure 2 is a transverse sectional view taken on the line 2—2 of Figure 1; and

Figures 3 and 4 are fragmentary sectional views taken through the clamping collar and pipe showing the set screw in different stages of piercing the pipe.

In the construction of outdoor electric switches and the like, it is common practice to use ordinary galvanized pipes in making connecting links between the operating arms of rotating insulators, rotary shafts, push and pull members etc. The main difficulty heretofore encountered in making satisfactory connections between the pipes and associated parts has been the inability to prevent them from working loose, due to strains, vibration and rust. As such connections are made in the field, various forms of self-piercing set screws have been employed, but with little or no success because the set screws gradually work loose due to strains and vibrations. Moreover, as the joint between the set screw and the pipe was not air-tight, rust would start at that point and, eventually, the pipe would have to be replaced. This invention overcomes all of these objections by providing an improved set screw which pierces a pipe with very little effort and is forced into wedging engagement with the aperture thus formed, so as to make a positive non-loosening connection.

Referring particularly to the drawing, a collar 10 is shown as being secured to a piece of pipe 11 by means of a set screw 12 embodying the invention. The collar 10 is illustrative of any member to be connected to a pipe by a set screw. Herein the collar has a perforated ear 13 for pivotally connecting it to the operating arm of a rotating insulator, such as is illustrated in my Patent 2,158,722. Such collars are usually made of one piece for strength and cheapness. It is shown as having a radial boss 14 provided with a screw-threaded opening 15 to receive the set screw 12. Transverse ribs 16 are cast integral with the boss and collar to reinforce them in the vicinity of the opening 15. The opening or bore 17 of the collar is slightly larger than the pipe to which it is to be applied so that it may be readily slipped on the pipe and moved to the desired location without binding. This obviates the necessity of making the collar of two pieces and clamping them to the pipe.

The end of the set screw 12 is shown as being reduced and slightly tapered to form a frusto-conical extension 18, the largest diameter of which is adjacent to the screw threaded portion of the screw. The extension has a biased cut end portion 19 and the opposite end of the screw has the usual non-circular head 20.

After the collar has been properly located on the pipe 11, the set screw is rotated in the proper direction to cause the inner end thereof to engage the pipe. Continued rotation of the set screw will cause the lower leading edge of the bevelled end to force its way through the metal wall of the pipe by both shearing and swaging action (see Figure 3) until the lower end of the extension breaks through the pipe wall as shown in Figures 2 and 4.

As the screw advances, the tapered extension will be wedged into the opening and cannot back out accidentally. Furthermore, the frusto-conical extension being tightly wedged into the opening completely seals the opening throughout its length so that moisture cannot enter it to promote rust. Also, because of the wedging fit, it is not necessary to rotate the screw beyond the position shown in Figures 2 and 4 until the end screw threads engage the pipe, as is required when using some of the prior set screws.

Referring to the biased end 19 of the set screw, it will be observed that the angle of inclination is greater than the thread angle of the screw threads. This is preferred because it reduces the amount of effort necessary to force the screw through the pipe wall. It will be apparent that as the screw is rotated, say, one-half revolution, any point on it advances a distance equal to one-half of the pitch of the threads or, for ⅜ inch 16 thread screws, about $\frac{1}{32}$ inch. If the end of the extension is cut so that the vertical distance between the leading edge or tip and heel thereof is, say, $\frac{1}{16}$ inch, then there will always be $\frac{1}{32}$ inch clearance between the trailing edge or heel of the extension and the bottom of the hole directly beneath it. This is illustrated in Figure 3.

In the use of set screws with squared ends, the entire end surface is always in contact with the bottom of the hole being formed, but with the construction shown therein, only a portion of the end surface can be in contact and all pressure exerted by the screw is concentrated on this reduced area. This enables standard threads to be used without stripping. In other words, ample clearance is provided for the leading edge of the extension, thereby reducing the turning effort required for the screw.

Of course, it is contemplated, that at least the extension 18 shall be case hardened and the whole set screw will be rust proofed by ordinary electro-plating or the like.

From the foregoing description, it will be seen that the connecting means includes an improved set screw which is extremely effective not only to pierce a pipe wall, but also to wedge itself firmly in the opening formed to prevent loosening of the screw and rusting of the pipe. It can be made in standard sizes at a very low cost, comparable with that of conventional set screws.

Obviously, the present invention is not restricted to the particular embodiment thereof, herein shown and described.

What is claimed is:

1. A self-piercing screw comprising a threaded shank having means for turning it at one end; and an integral, smooth, frusto-conical, hardened extension of reduced diameter at the other end and having a biased work engaging end, the angle of inclination of said biased end being greater than the thread angle of the screw threads.

2. A self-piercing screw comprising a threaded shank having means for turning it at one end; and an integral, smooth, frusto-conical, hardened extension of reduced diameter at the other end and having a biased work engaging end, the angle of inclination of said biased end being greater than the thread angle of the screw threads, the largest diameter of said extension being adjacent to the threaded shank.

3. A self-piercing set screw for punching its way into a metal wall and providing a connection thereto comprising a screw-threaded shank having a reduced, plain end portion to pierce the wall, the piercing end being beveled at an angle greater than the thread angle of said screw threads to provide a relieved toe portion at one side to exert progressive, concentrated swedging and shearing pressure on the engaged wall as the screw is turned and advanced therein.

TOMLINSON F. JOHNSON.